March 5, 1963 L. A. BAIN, JR., ET AL 3,079,672
METHODS OF MAKING ELECTRICAL CIRCUIT BOARDS
Filed Aug. 17, 1956
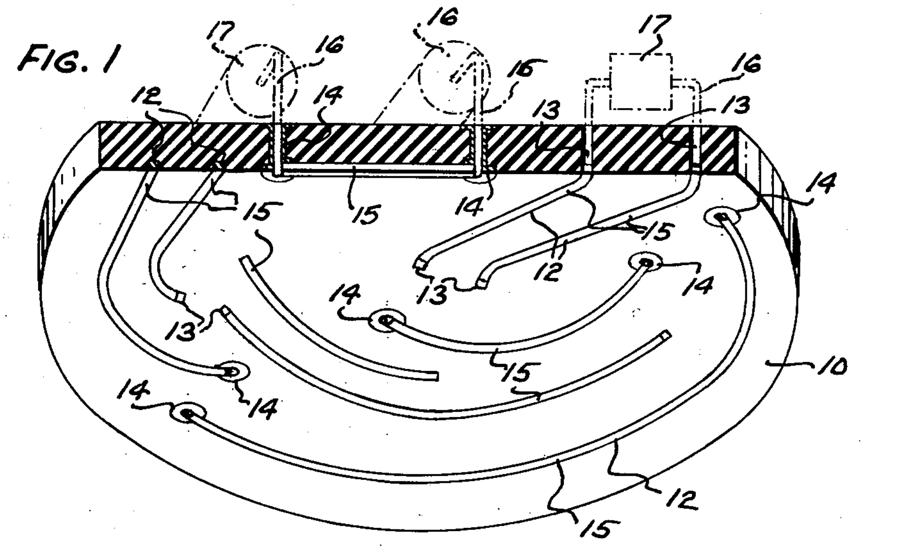
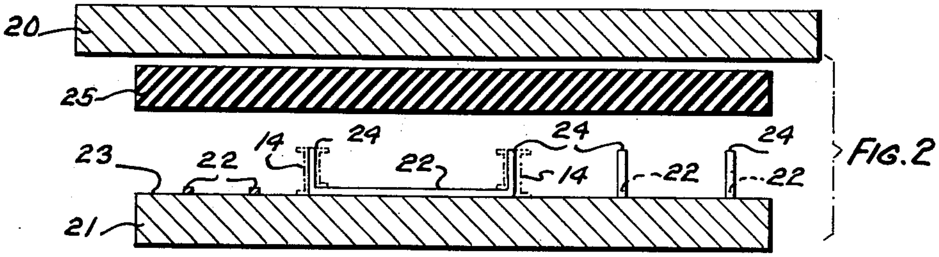
FIG. 2
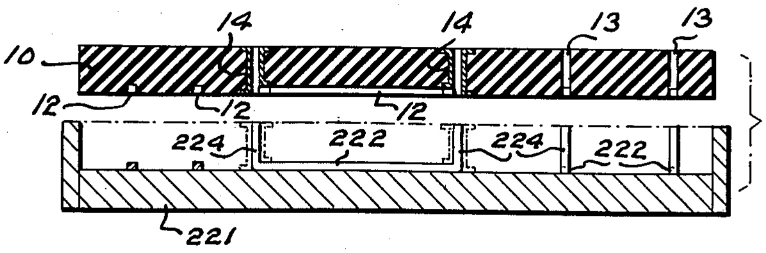
FIG. 4
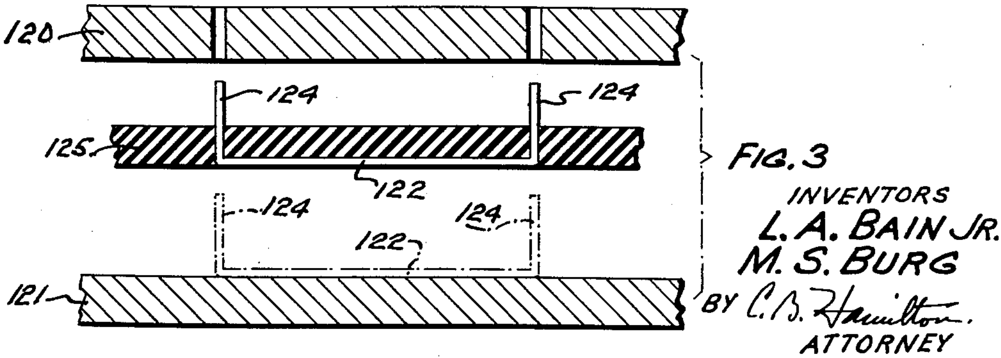
FIG. 3
INVENTORS
L. A. BAIN JR.
M. S. BURG
BY C. B. Hamilton
ATTORNEY

United States Patent Office 3,079,672

Patented Mar. 5, 1963

3,079,672
METHODS OF MAKING ELECTRICAL CIRCUIT BOARDS

Lewis A. Bain, Jr., Hinsdale, and Martin S. Burg, Chicago, Ill., assignors to Western Electric Company, Incorporated, New York, N.Y., a corporation of New York Filed Aug. 17, 1956, Ser. No. 604,838
2 Claims. (Cl. 29—155.5)

This invention relates to the art of printed wiring and more particularly to methods of making wired boards.

Objects of the invention are to provide new and improved methods of forming wired dielectric boards.

Another object of the invention is to provide new and improved methods of forming blocks of plastic material with grooves therein and filling the grooves with metal to provide wired boards.

A further object of the invention is to provide new and improved methods of forming wired boards having apertures and/or tubular terminals therein for receiving leads of electrical components and having conductors embedded in grooves therein and extending between predetermined apertures and/or terminals for electrically interconnecting the components.

An apparatus illustrating certain features of one embodiment of the invention may include a die having projecting pins thereon and ribs extending between the pins. The die is pressed into a sheet of thermoplastic insulating material to perforate the sheet at predetermined points and to form grooves therein extending between predetermined perforations. Tubular terminals may be applied to some of the pins on the die and pressed through and embedded in the insulating sheet which is then removed from the die and electro-conductive material filled into the grooves to form conductors extending between predetermined perforations and extending between and electrically interconnecting predetermined terminals.

In another embodiment of the invention the die may be used for molding a dielectric board wherein tubular terminals are placed on the pins and a plastic material is cast around the terminals and over the ribs of the die and hardened. The board thus formed is then removed from the die and the grooves therein are filled with electro-conductive material to electrically interconnect predetermined terminals.

A complete understanding of the invention may be obtained from the following detailed description of methods and an apparatus forming specific embodiments of the invention, when read in conjunction with the appended drawings, in which FIG. 1 is a fragmentary perspective sectional view of a wired board made by apparatus and methods forming specific embodiments of the invention;

FIG. 2 is a fragmentary vertical sectional view of an apparatus for practicing a method forming one embodiment of the invention;

FIG. 3 is a fragmentary vertical sectional view of an apparatus for practicing a method forming another embodiment of the invention and showing a wired board made thereby; and FIG. 4 is a sectional view of an apparatus for practicing a method forming another embodiment of the invention and disclosing a wired board made thereby.

Referring now in detail to the drawings there is shown several embodiments of apparatus for forming wired dielectric boards 10 (FIG. 1) having grooves 12 formed therein and transverse apertures 13 at the ends of the grooves and having tubular type terminals or connectors 14 at the ends of other grooves 12. Conductors 15 in the grooves 12 extending between the aperture 13 and the terminals 14 electrically interconnect predetermined terminals and also leads 16 of electrical components 17 inserted into the terminals 14 and into the apertures 13.

The apparatus illustrated in FIG. 2 includes a fixed platen 20 and a movable platen or die section 21 which is heated by an suitable means and is movable by means (not shown) relative to the platen 20. Preformed square wires 22 are spot welded or otherwise secured to the face 23 of the movable platen and heated therewith to form the grooves 12 in the board 10 and the wires have upturned ends 24 which form the apertures 13 in the board and which also serves as posts to mount the terminals 14 thereon. Each of the terminals 14 has a recess formed in one end thereof for receiving the wire 22 to allow the terminal to rest on the face 23 of the movable platen 21. After the terminals 14 have been placed on predetermined ones of the ends 24 of the wires 22 a sheet 25 of thermoplastic material, such as cellulose acetate, cellulose acetate butyrate, or polyvinyl chloride, having good physical and electrical insulating properties is placed between the platens 20 and 21 and the platen 21 is actuated to press the wires 22 into the lower face of the sheet 25 and form grooves 12 therein and push the ends 24 of the wires and the terminals 14 into and completely through the sheet to embed the terminals therein.

The platens 20 and 21 are then separated and the wires 22 with their upturned ends 24 are withdrawn from the sheet 25 and from the apertures 13 and the terminals 14, the latter of which remain in the partially formed board 10 at the ends of predetermined grooves 12. The board 10 is then inverted and an electrically conductive material is sprayed into the grooves 12 or an amalgam is trowelled into the grooves and hardened to form the conductors 15 which are securely held in the square grooves 12 and extend between predetermined apertures 13 and terminals 14 and electrically interconnect predetermined terminals. The amalgam may be any one of a number of well known amalgams, such as silver amalgam, which expand upon solidification to anchor the conductors formed thereby in the grooves. A mask is used to cover the ungrooved portions of the face of the board when the metal is sprayed into the grooves.

In another embodiment of the invention (FIG. 3) preformed wires 122 are temporarily fastened to the lower movable platen 121 by clips or other suitable fasteners in a predetermined pattern with the end portions 124 of the wires projecting upwardly. A sheet 125 of thermoplastic material is disposed between the platen 121 and the upper fixed platen 120 and the lower platen is actuated to press the wires 122 into the plastic sheet 125. The platen 121 is then withdrawn, leaving the wires 122 embedded in the board 10 with the intermediate portions of the wires filling the grooves 12 in the board and forming the conductors 15, and the ends 124 of the wires extending through the board and projecting from the upper side thereof to form mounting or terminal posts to which electrical components may be connected.

In the embodiment shown in FIG. 4 a die 221 is provided with side walls around its periphery to form an open mold cavity. Preformed square wires 222 are welded or otherwise secured to the upper flat face of the die 221 in a predetermined pattern with the ends 224 of the wires extending upwardly therefrom in predetermined positions. Tubular terminals 14 are then placed on the ends 224 of the wires and a casting resin such as a polyester or an epoxy resin or a suitable thermoplastic material in a liquid or semi-liquid state is poured into the mold cavity to a level substantially flush with the upper ends of the terminals 14 and hardened around the terminals to form the board 10. After hardening, the board 10 with the terminals 14 embedded therein is withdrawn from the die 221 and the grooves 12 formed in the board are filled with amalgam or other low-melting metals to form the conductors 15 interconnecting predetermined terminals.

The above-described methods and apparatus serve to quickly and inexpensively form wired boards from the thermoplastic or thermosetting material to form low cost wired boards in which conductors are embedded in one face thereof for interconnecting electrical components placed in contact therewith and in which apertures or tubular terminals are provided at the ends of predetermined ones of the conductors for receiving leads of the electrical components and electrically connecting them to the conductors.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of making electrical circuit boards which comprises forming wires into predetermined shapes with the end portions of predetermined length disposed parallel to one another in the same direction transversely of the intermediate portions of the wires, heating the wires and moving the wires parallel to the end portions thereof in a direction toward and perpendicular to a thermoplastic board of less thickness than the length of the end portions of the wires to force the end portions of the wires through the board to form terminal posts projecting from the board and to embed the intermediate portions of the wires in the board.

2. A method of embedding U-shaped wires in a flat thermoplastic insulating board which comprises the steps of detachably clipping the bights of the U-shaped wires to a first movable platen with the legs of the wires perpendicularly projecting from the surface of the first platen, supporting the insulating board over the ends of the legs of the wires, heating the first platen and the wires to a degree sufficient to place the insulating board in a softened state, advancing the platen to advance the insulating board against a second fixed platen having spaced holes to accommodate the heated legs and to force the end portions of the wires through the insulating board to form terminal posts projecting therefrom, and then moving the first platen from the second platen to detach the wires from the clips to leave the bights and portions of the legs embedded in the insulating board.

References Cited in the file of this patent

UNITED STATES PATENTS

| | | |
|---|---|---|
| 1,694,802 | Stuart | Dec. 11, 1928 |
| 1,739,246 | Majce | Dec. 10, 1929 |
| 2,120,711 | Phillips | June 14, 1938 |
| 2,320,498 | Wheeler | June 1, 1943 |
| 2,599,710 | Hathaway | June 10, 1952 |
| 2,716,268 | Steigerwalt | Aug. 30, 1955 |
| 2,722,720 | Karniol | Nov. 8, 1955 |
| 2,734,150 | Beck | Feb. 7, 1956 |
| 2,743,507 | Kornei | May 1, 1956 |
| 2,773,158 | Myers | Dec. 4, 1956 |
| 2,862,992 | Franz | Dec. 2, 1958 |
| 2,955,351 | McCreadie | Oct. 11, 1960 |

FOREIGN PATENTS

| | | |
|---|---|---|
| 515,813 | Great Britain | Dec. 14, 1939 |
| 205,694 | Switzerland | Sept. 16, 1939 |

OTHER REFERENCES

Printed Circuit Techniques, National Bureau of Standards Circular 468, Nov. 15, 1947.